Jan. 24, 1956  H. E. DARNEY  2,732,502
CONTROL SYSTEM FOR IRRADIATOR UNIT
Filed Sept. 20, 1951  3 Sheets-Sheet 1
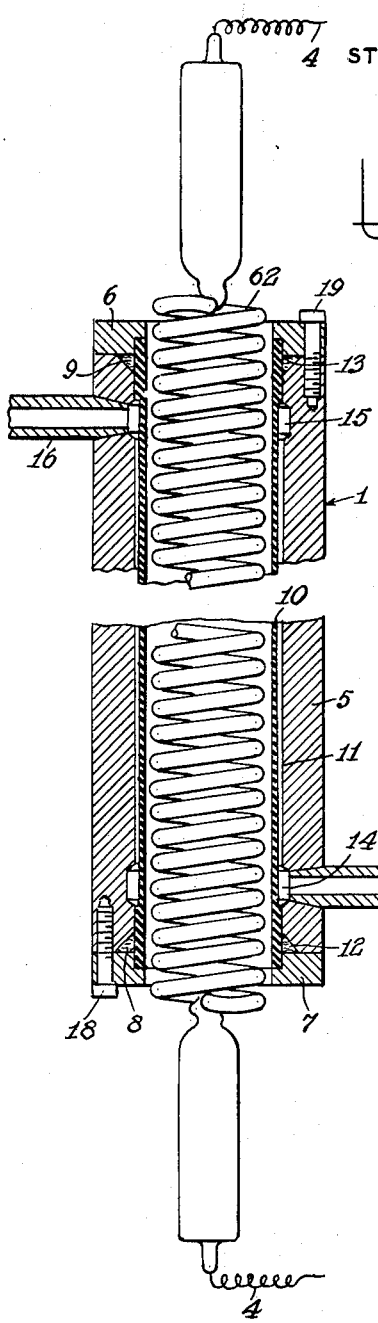
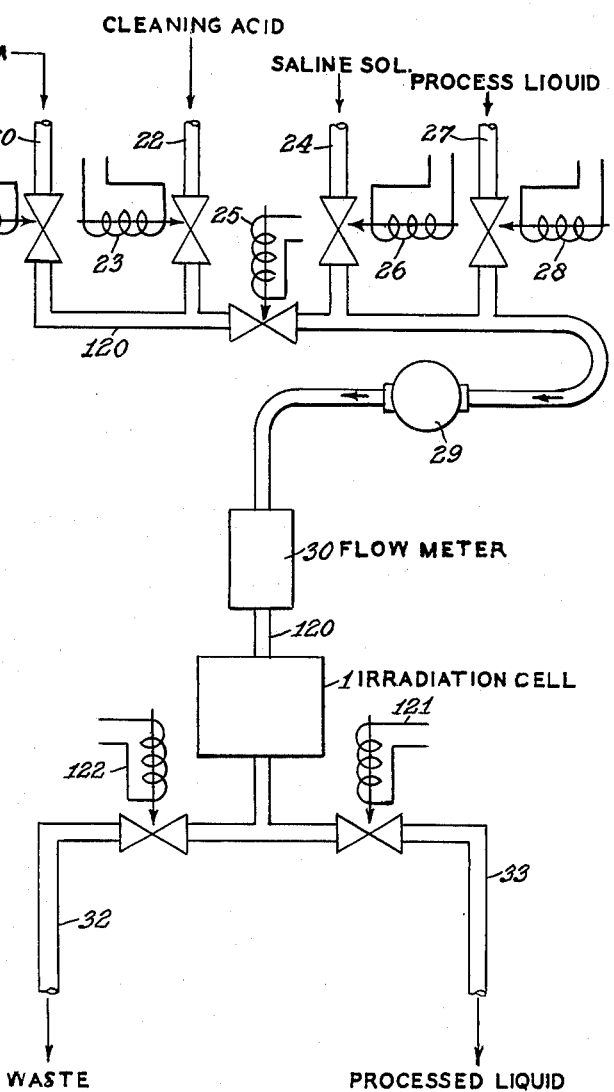
INVENTOR.
HAROLD E. DARNEY
BY
ATTORNEY

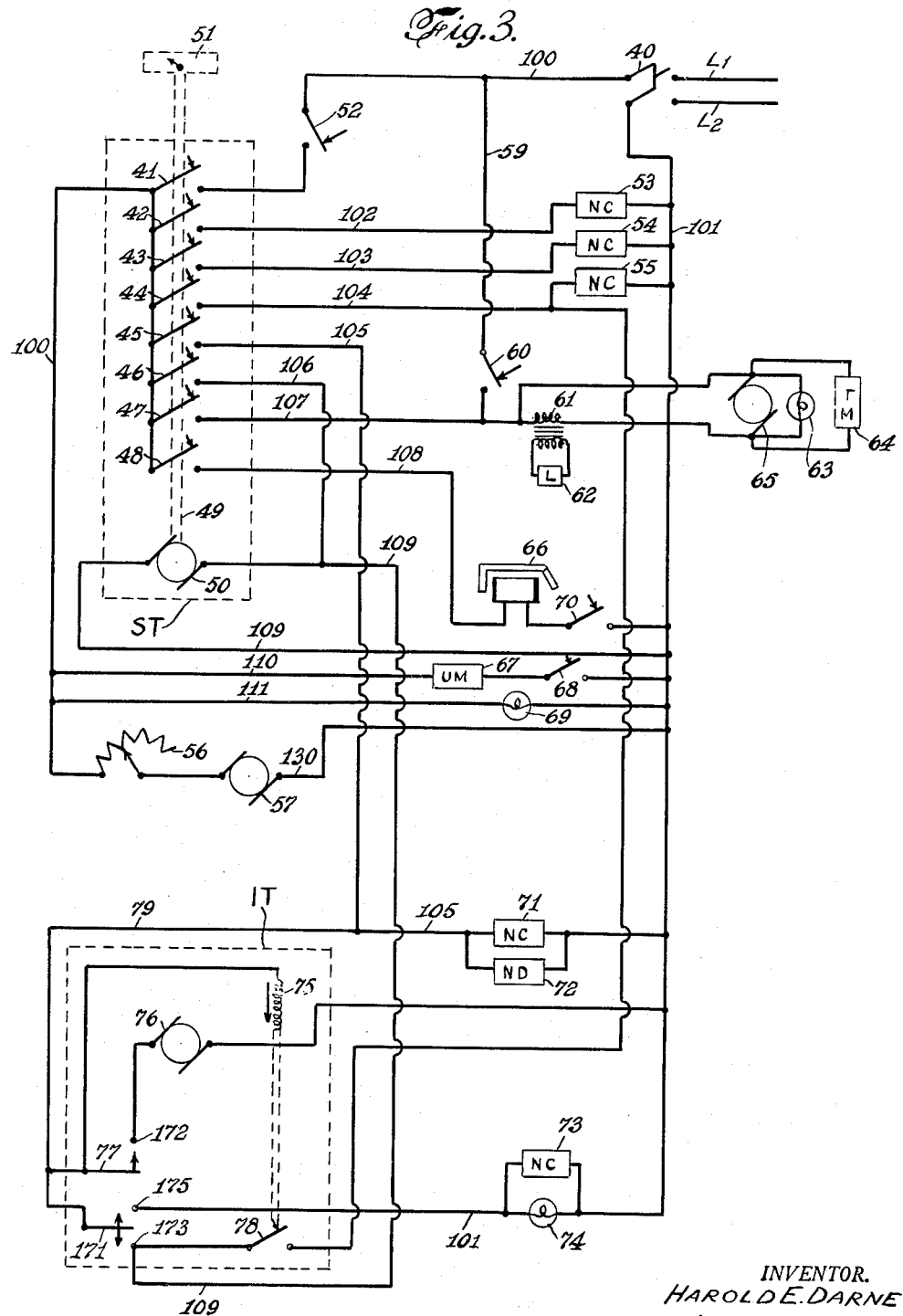

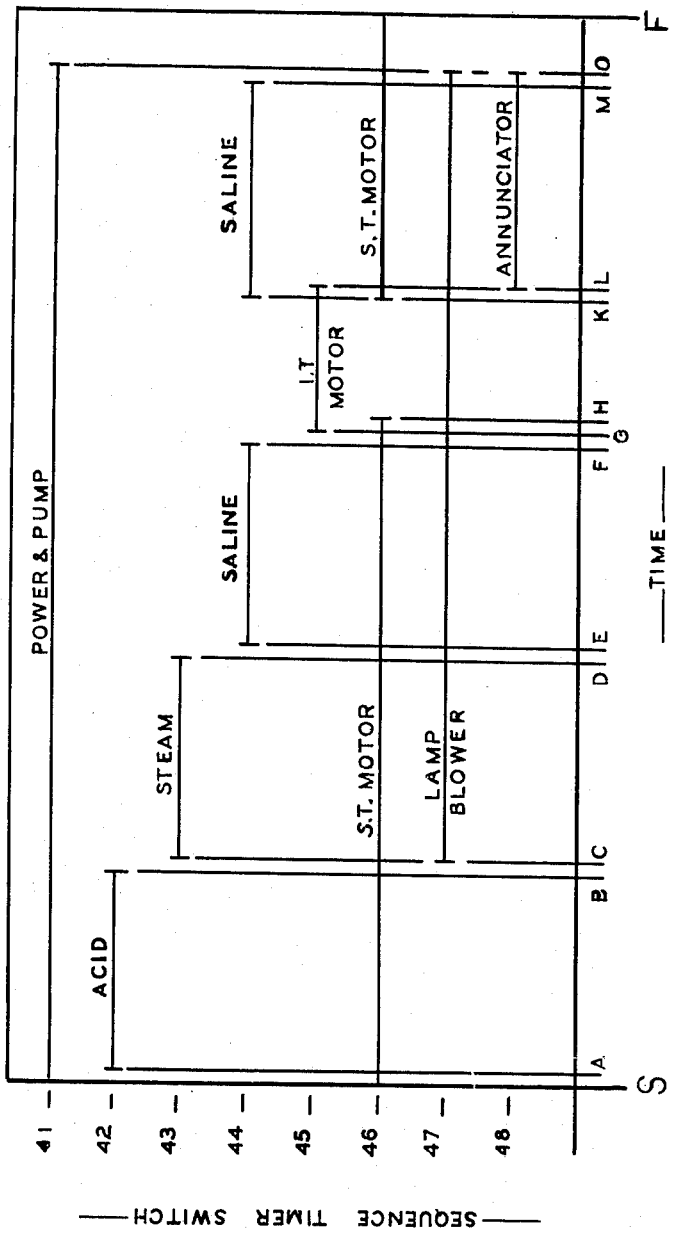

United States Patent Office 2,732,502
Patented Jan. 24, 1956

2,732,502

CONTROL SYSTEM FOR IRRADIATOR UNIT

Harold E. Darney, Bloomfield, N. J., assignor to Hanovia Chemical and Mfg. Company, Newark, N. J., a corporation of New Jersey Application September 20, 1951, Serial No. 247,521

15 Claims. (Cl. 250—45)

This invention concerns the irradiation of fluids and is particularly concerned with apparatus for controlling an irradiation cycle.

The irradiation of fluids with ultraviolet rays for the production of biological reactions, such as the destruction of bacteria and other micro-organisms, and photochemical reactions such as the production of vitamin D, is effective only where a number of factors are carefully controlled. For example, one of these factors is the wave length of the radiators, i. e. the extent to which a given amount of radiant energy affects a biological or photochemical reaction depends upon the number of spectral ultraviolet lines for a given radiation. This factor may be controlled within predetermined limits by the proper selection of one of the many different types of ultraviolet ray discharge lamps that are available on the market; those lamps having an envelope of fused quartz being permeable to radiations of shorter wave length than are the lamps having envelopes consisting of glasses of lesser silica purity than quartz.

Another of the factors affecting the extent of irradiation is the intensity of the radiant energy. This factor can be simply controlled by selecting a proper wattage lamp and placing it the proper distance from the "process" fluid or the fluid undergoing treatment.

Another factor affecting irradiation is the time period during which each particle of the fluid undergoing treatment is exposed to the radiant energy. This time period must be accurately controlled in order to avoid underexposure or overexposure to irradiation. Further factors which determine the extent to which each particle of the fluid being treated is exposed to ultraviolet rays are the thickness of the body of the fluid, and the rate at which the fluid flows past the source of energy.

In order to ensure that each and every particle of the fluid will become irradiated I employ an irradiation cell which may direct the process fluid vertically, as for example, an irradiator made according to the disclosure hereinafter following. In such an irradiation cell the depth of film of the "process" fluid is limited to that through which ultraviolet rays will penetrate as determined by known spectroscopic methods. Although such a device does fairly accurately control the time period during which a fluid is subjected to irradiation by virtue of its constructive arrangement of parts it is still desirable to attain a more accurate control of the time period.

There are also various preparatory operations which must be performed upon the irradiation cell prior to the admission of "process" fluid. The operations have been manually performed in the past, thus requiring a high degree of manual skill and a time delay. Such operations involve acidizing, steam cleaning, washing with saline solution, etc.

It is, therefore, an object of this invention to provide a system of controlling the irradiation cycle. It is a further object to provide automatic, self cleaning equipment for the irradiation of fluids e. g. the sterilization of biological liquids. It is a still further object to provide equipment operable to perform an irradiation cycle in time controlled steps which requires only casual checking during its cycle. Another object of my invention is to provide equipment which ensures a greater flow of "processed" fluid than that presently known.

Other objects and advantages of the invention will become apparent from the following description when taken in connection with the accompanying drawing, in which:

Fig. 1 is a sectional view of an irradiation cell,
Fig. 2 is a schematic liquid flow diagram,
Fig. 3 is a diagrammatic view showing the various circuits of the apparatus, and
Fig. 4 is a graphical representation of the various operations and their sequence of performance.

In order to provide for an accurate timing of the various operations and ensure a correct sequence of performance, my equipment includes process sequence timers which control electrically actuated valves in such a manner as to automatically clean and flush the irradiator prior to the admission of "process" fluid, to irradiate the "process" fluid and discharge it to a collector, and then to rinse the irradiation cell with a flushing fluid and shut off the flow, thus putting the apparatus in condition for immediate reuse.

The numeral 1 indicates generally the type of irradiation cell contemplated for use with my apparatus. However, other types of irradiation cells may be used therewith since the particular construction of such cells is of no especial significance herein as long as such a cell provides for the circulation of "process" fluid therethrough under exposure to ultraviolet irradiation. The preferred irradiation cell of Fig. 1 includes an outer tubular jacket member 5 preferably made of a metal inert to the particular fluids involved, e. g. stainless steel, and an inner hollow cylindrical liner 10. Recessed into the inner surface of the outer member is a flat groove 11 which is shown as being toroidal but which may be helical, the maximum depth of which does not exceed the maximum thickness to which a film of the fluid to be treated may be formed before it becomes opaque to ultraviolet rays. The depth of groove 11 is changed by using different members 5, accordingly as various fluids of different ultraviolet ray transparencies are processed.

The liner 10, is substantially the same length as the tube 11 and is telescoped on the inside thereof, and is formed of a material which is transparent to the ultraviolet wave length being used. The preferred material for forming the liner is quartz, however, for some purposes the liner may be formed from other materials transparent to the radiation involved, e. g. for ultraviolet radiations one of the well known ultraviolet ray transparent synthetic resins or from glasses of less silica purity than quartz may be used.

Cap members 6 and 7 are placed on the top and bottom of the jacket 5 and serve to compress the gasket rings 8 and 9, respectively, into the triangular cross-sectioned annular grooves 12 and 13, effecting a seal between inner and outer members 5 and 10. The gasket may be of any resilient material inert to the fluids involved. Cap screws 18 and 19 serve to force the end caps 6 and 7 against the gaskets 8 and 9 to produce the pressure needed for an effective seal.

An inlet conduit 17 is provided connecting a fluid supply to the annular ring 14, which allows for even distribution of fluid circumferentially about the cell. The fluid from ring 14 traverses groove 11 and is collected at ring 15 and expelled through conduit 16. If desired, the fluid may flow in the opposite direction entering through conduit 16.

To irradiate the fluid as it travels upwardly through the passageway there is provided a lamp 62 having tightly wound coils, as shown, around the inside of the liner 10, and radially spaced from the liner by a predetermined distance. The envelope of the lamp consists preferably of fused quartz, however, it may be formed from a glass of lesser silica purity than commercially pure quartz, so long as it is appreciably transparent to ultraviolet rays, i. e. wave lengths below 2600 A. When it is desired to sterilize the fluid being irradiated, as for example, blood, blood plasma, blood serum, ACTH, vaccines, etc., it is customary to use a lamp containing an inert gaseous filling mixed with mercury at relatively low pressure. Such a lamp is commonly referred to by those skilled in the art as being a "cold quartz lamp." When it is desired to use the device of this invention for the production of photochemical reactions such as producing vitamin D, the lamp may be of the well known high pressure mercury arc type. The electrodes 3, 4 of the lamp 62 are connected to a source of controlled electrical energy, which is not shown on the drawing, the manner of energizing such lamps, being well known to those skilled in the art.

By using the irradiation cell as described above, it is possible to control the factors affecting irradiation of a fluid with ultraviolet rays so that the reaction will occur to the extent of completeness desired. However, the exposure time, which is controlled by the upward or downward movement of the fluid or by travel in a helical path can be further controlled by means of the solenoid operated valve system as shown in Fig. 2.

The irradiation cell 1 is connected into a supply pipe 120. A supply 22 of nitrosulfuric acid is arranged to be admitted into the supply pipe 120 upon the operation of solenoid actuated valve 23. Steam supply 20 is connected to supply line 120 and will conduct steam from a source (not shown) to the cell upon the opening of solenoid actuated valves 21 and 25 placed in pipelines 20 and 120 respectively. Cut-off valve 25 is so located that upon closing it can restrict the admission of steam and acid regardless of the position of valves 21 and 23. However, if desired, valve 25 can be omitted and reliance placed on valves 21, 23 alone. Where a supply of steam is not readily available a small steam generator could be used. Saline solution supply 24 is connected to pipe 120 upon the actuation of solenoid valve 26. Finally, the "process" fluid (i. e. the fluid to be treated) in supply line 27 is admitted to the supply pipe upon actuation of solenoid valve 28. A pump 29, e. g. gear type pump (wherein the parts may be of a material inert to fluids being pumped) with means for controlling flow rate is located in pipe 120 to deliver the various fluids to the irradiation cell. Arranged in line 120 on the output side of pump 29 is a flow metering device 30. This device is used to show the rate of flow of the "process" fluid and is calibrated in the specific gravity thereof. However, in order to run other fluids, calibration charts would be provided relating such flow to scale readings. A chart would also be provided correlating the flow of "process" fluid and the flow of the acid solution, so that the proper flow of acid during the cycle can be regulated as soon as the equipment is started. The operator would thus only be required to make a visual check when the process fluid is running. On the outlet side of the cell 1 are provided collection devices for the processed liquid 33 and for the waste products of the cleaning operations 32; admission to these collection devices being controlled by the operation of solenoid valves 121 and 122 respectively.

The electrical wiring diagram is somewhat schematically shown in Fig. 3. A manually operated master control switch 40 is provided to connect the equipment main lines 100 and 101 into the supply mains $L_1$ and $L_2$.

A process sequence timer ST of the cam type is arranged in the circuit to have its motor 50 actuated upon the closing of the master control switch and tripping of switch 46. A manual switch 52 is provided in line 100 to enable the stoppage of motor 50 while the timer is reset at any point in the cycle to repeat or eliminate any part of the cycle. The timer is reset by means of a dial knob 51 which rotates shaft 49 upon which are mounted the cams to operate the switches 41, 42, 43, 44, 45, 46, 47 and 48.

An ultraviolet meter 67 is parallelled across lines 100 and 101 and connected into the line 110 by means of switch 68. This meter permits determination of intensity so that accurate irradiation can be given to the process fluid.

The pump motor 57 is arranged in the line 130 to be speed-controlled by rheostat 56.

Normally closed solenoid actuated valves 53, 54, and 55 are arranged in lines 102, 103, 104 respectively, to be actuated when the sequence timer operates to close switches 42, 43, 44 respectively. The solenoid valves 53, 54, 55 are normally closed and upon actuation operate to allow the admission of acid, steam and saline solution respectively into the pipe 120.

Arranged in line 107 to be actuated by operation of sequence timer switch 47 is the lamp 62. The lamp is operated by transformer 61, and cooled by a fan driven by motor 65. A small blower can also be used to regulate the temperature in the equipment and provide cooling for the lamp and transformer.

An elapsed time or running time meter 64 is arranged in parellel with lamp 62 to indicate the service time of the lamp or burner and thus enable a replacement of lamps at predetermined times to prevent any failure while running a cycle. The lamp may be kept on continuously by by-pass switch 60 arranged in line 59 to deliver power from the mains. Thus the unit can be immediately re-used at the end of a cycle without waiting for the arc to form.

Arranged to be operated by sequence timer switch 48 in line 108 is an annunciator 66 which emits audible and visible signals such as a pilot light and chimes, when the "process" fluid flow has halted and continues to emit signals until the end of the cycle or until manually shut off by a switch 70.

Connected in line 79 are parallelly arranged solenoid valves 71 and 72 which admit fluid into the process liquid collection device 33 and the waste collection device 32 respectively. The waste valve 72 is normally open whereas the "process" collection valve 71 is normally closed. Thus when the sequence timer ST closes switch 45 to actuate the solenoids 71, 72 the position is reversed and the flow line to the waste tank is then closed and the process fluid is allowed to flow into its collection tank. Solenoid valve 73 is arranged in line 101 to be actuated by the interval timer to admit "process" liquid to the irradiation cell.

Various pilot lights such as 63, 69 and 74 are arranged throughout the circuit to indicate when the several elements of the unit (e. g. the lamp 62 or the "process" fluid valve 73) are in operation.

The "process" interval timer IT comprises a timer motor 76, a solenoid "clutch" coil 75 which when actuated operates to close switch 78 and solenoid switches 77 and 171. The switch 77 is movable into and out of engagement with contact 172. The switch 171 is movable into engagement with contact 175 or contact 173.

In the "off" or "reset" position of the interval timer the switch 77 is closed in engagement with contact 172, and switch 171 is in engagement with contact point 175 while switch 78 remains open.

Upon the actuation of switch 45 by the sequence timer, current is supplied to operate the interval timer motor 76 and put the IT timer on its "on" or "timing" position. In the "timing" position the switch 77 remains closed and switch 171 remains closed to engage the contact 175 while switch 78 is now closed.

In the "timed-out" position of the interval timer the switch 77 is thrown open and switch 171 is now reversed to engage contact 173 to actuate saline solution solenoid valve 55 and to restart motor 50 while switch 78 remains closed. Also "process" liquid flow is stopped.

After a short time interval the "clutch" 75 is deactivated upon the opening of sequence timer switch 45 and the interval timer is reset or put into the "off" position indicated above.

The circuit operable during the "timed out" position of the IT is hereinafter referred to as a change-over relay circuit, and the circuit operable during the "timing" position of the IT is hereinafter referred to as a maintaining circuit.

The sequence of cycle operations is indicated in Fig. 4. Upon the closing of the master switch 40 providing power to the cam-type sequence timer the switches 41 and 46 are closed thus setting the pump 29 and motor 50 in operation. This starting point is indicated as "S" in Fig. 4. At time interval S—A or at time "A" the switch 42 is closed thus opening the valve 53 to admit nitrosulfuric acid to clean the equipment and dissolve and remove any foreign matter for a time period of A—B. At time "C" the switches 43 and 47 are closed to simultaneously operate valve 54 to admit steam into the unit to sterilize the lines and to start the lamp and blower unit. The blower immediately operates to cool the unit. A time period of C—G is thus made available to permit the lamp arc to stabilize before the "process" fluid is admitted to the cell. At time "D" switch 43 is opened, cutting off steam flow. At time "E" the switch 44 is closed to actuate valve 55 to admit saline solution to flush the unit to remove entrapped air for a time period of E—F.

At time "G" the switch 45 is closed to actuate motor 76 of the interval timer, the switch 45 thus setting the IT into its "timing" position. The ST switch 46 remains closed until time "H" thus providing a timed overlap "G—H" to ensure the delivering of current to and the starting of the IT motor 76. In its "timing" position the IT operates to reverse the position of solenoid valves 71, 72 to switch from the waste collector to the "process" fluid collector system. At time "G" the IT also operates to open valve 73 to admit "process" fluid into the irradiation cell. The time period G—K during which "process" fluid is admitted is hereinafter referred to as the maintaining interval and can be manually set to any desired period by a manual control on the IT which can be varied from any desired maximum time interval to a minimum time interval equal to at least 3% of the maximum. A satisfactory IT unit could be one such as the "Cycl-Flex" made by the Eagle Signal Corporation.

At time "K" the IT is "timed-out" and the valves 71, 72 are reversed to switch to a waste collector system while simultaneously valve 73 is deactivated to stop the "process" fluid flow. Also at time "K" the IT switch 171 engages contact 173 to restart motor 50 by supplying power through line 109; furthermore the switch 78 being still closed, power is also transmitted to operate saline valve 55 to admit saline solution to flush the cell. At time "K" the switch 44 closes to take over control of the saline valve operation and switch 46 closes to take over the operation of motor 50. At time "L" switch 45 opens and the IT is reset by the release of "clutch" 75 into its "off" position.

The switch 44 remains closed for a time period "K—M" to flush the cell with saline solution. A continuous flow of fluid is therefore maintained through the cell to insure the irradiation of all the "process" fluid and to prevent over-exposure since as the last portion of the process fluid is being admitted to the cell the saline solution is admitted. It is possible that the "process" fluid may become intermixed with some saline solution. However, such solution does not contaminate the "process" fluid since in any event in the case of blood plasma or serum, for example, saline solution is added thereto before the biologic solution is administered.

At the time "L" the ST switch 48 is closed to actuate the call annunciator 66 to indicate cessation of irradiation of "process" fluid. The annunciator can be immediately shut off by operating switch 70 or it can be left on until the end "O" of the cycle at which time the switches 41, 47 and 48 are thrown open.

Although only one form of the invention is herein shown and described, it will be understood that various changes may be made without departing from the spirit of the invention. For example, timing units other than the cam type sequence timer shown can be used (e. g. rotatable multiple switch). Further cleaning fluids other than nitrosulfuric acid and steam and a rinsing fluid other than saline solution can be used.

Having now described and illustrated the nature of my invention, what I wish to claim and to secure by Letters Patent is:

1. An irradiation control system comprising a process fluid supply means, a cleaning fluid supply means, and a flushing fluid supply means, all in combination with an irradiation cell having a fluid passageway through which said fluids may pass, fluid supply conduits interconnecting said several supply means to said cell, collection means for said process fluid and a separate collection means for said other fluids, electrically actuated valve means for controlling the fluid supply from each supply means to said cell and from said cell to the two collection tank means, the process fluid supplied to said cell circulating upwardly in said passageway, and a time controlled circuit for electrically actuating said valve means, said circuit including a sequence timer means electrically operable to alternately actuate said valve means to first admit cleaning fluid and then flushing fluid to said cell and after said process fluid has passed through said cell to again admit flushing fluid therethrough.

2. A system as defined in claim 1 wherein said sequence timer means is also manually operable, and an interval timer means is included in the control circuit and is arranged to be electrically actuated by said sequence timer means prior to the final admission of flushing fluid to said cell.

3. The system as defined in claim 2 wherein said interval timer has a maintaining circuit having a predetermined maintaining interval for actuating the valve means for the maintaining interval and including a change-over relay circuit, said sequence timer being responsive to said change-over relay circuit to actuate said valve means to readmit flushing fluid to said cell.

4. The system as defined in claim 3 wherein said control circuit includes an annunciator which is operated by a switch of said sequence timer means, said switch being closed at the moment the interval timer unit ceases operation.

5. The system as defined in claim 4 wherein the sequence timer means has a predetermined period of operation greater than the maintaining circuit period, the difference between the periods constituting an irradiation cell preparation period during which the cell is cleaned and flushed.

6. Apparatus for controlling an irradiation cycle including an ultraviolet ray irradiation cell of the type wherein a gaseous discharge lamp is mounted in close association therewith to generate the irradiations, said cell including a fluid passageway through which fluid is forced to travel vertically through the path of said irradiations, the passageway having a depth which does not exceed the maximum thickness to which a film of the liquid to be treated may be formed before it becomes opaque to ultraviolet rays, a supply conduit and a delivery conduit connected to the ingress and egress respectively of said cell passageway, a source of steam, a steam conduit interconnecting said source with said supply conduit, a first electrically operated valve means interposed in said steam conduit and operable to admit steam into said supply conduit, a source of acid supply connected to said supply conduit and a second electrically operated valve means interposed between said acid source and said supply conduit, a source of saline solution supply connected to said supply conduit and a third electrically operated valve means interposed between said saline source and said supply conduit, an electrically operated cut-off valve interposed in said supply conduit between said acid and said saline inlets and operable to cut off flow of both the steam and acid into the supply pipe; a process fluid supply source connected by means of a fourth electrically operated valve to said supply circuit, pump means in said supply pipe operable to deliver the various fluids to said cell, waste and processed fluid collecting means in said delivery conduit controlled by fifth and sixth electrically operated valves, and an electrical time controlled circuit means interconnecting said various valves for sequential operation.

7. Apparatus as in claim 6 wherein a flow metering device is interposed in said passageway between said pump and said cell to correlate the flow of the various fluids and wherein said acid is nitrosulfuric acid.

8. The apparatus of claim 7 wherein said pump has its moving parts made of an acid resistant material.

9. The apparatus of claim 6 wherein said control circuit includes a sequence timer means and a manually operable interval timer means arranged to be electrically actuated by said sequence timer means, said sequence timer means serving to alternately actuate the several valves to admit cleaning and flushing fluid to said cell prior to the admission of the process fluid, said interval timer means being actuated prior to a final admission of flushing fluid to said cell.

10. Apparatus for controlling an irradiation cycle including an ultraviolet ray irradiation cell of the type wherein a gaseous discharge lamp is mounted in close association therewith to generate the irradiations, said cell including a fluid passageway through which fluid is forced to travel vertically through the path of said irradiations, the passageway having a depth which does not exceed the maximum thickness to which a film of the liquid to be treated may be formed before it becomes opaque to ultraviolet rays, a supply conduit and a delivery conduit connected to the ingress and egress respectively of said cell passageway, a source of steam, a steam conduit interconnecting said source with said supply conduit, a first electrically operated valve means interposed in said steam conduit and operable to admit steam into said supply conduit, an acid supply source connected to said supply conduit and a second electrically operated valve means interposed between said acid source and said supply conduit, a saline solution supply source connected to said supply conduit and a third electrically operated valve means interposed between said saline source and said supply conduit, an electrically operated cut-off valve interposed in said supply conduit between said acid and said saline inlets and operable to cut off flow of both the steam and acid into the supply pipe; a process fluid supply source connected by means of a fourth electrically operated valve to said supply circuit, pump means in said supply pipe operable to deliver the various fluids to said cell, waste and processed liquid collecting means in said delivery conduit controlled by fifth and sixth electrically operated valves, and an electrical time controlled circuit means interconnecting said various valves for sequential operation including a manually operable sequence timer means and an interval timer means arranged to be electrically actuated by said sequence timer means, said sequence timer means serving to alternately actuate the several valves to admit cleaning and flushing fluid to said cell prior to the admission of the process fluid, said interval timer means being actuated prior to a final admission of flushing fluid to said cell, and wherein said interval timer means has a maintaining circuit having a predetermined maintaining interval and including a change-over relay circuit, said sequence timer means being responsive to said change-over relay circuit to actuate said valve means to readmit saline solution to said cell.

11. The apparatus as defined in claim 10 wherein said control circuit includes a call annunciator which is operated by a switch of said sequence timer means, said switch being closed at the moment the interval timer unit ceases operation.

12. The apparatus as defined in claim 11 wherein the sequence timer means has a predetermined period of operation greater than the maintaining circuit period, the difference between the periods constituting an irradiation cell preparation period occurring both before and after the maintaining circuit period.

13. An electrical control circuit for regulating an irradiation cycle including the preparation of an irradiation manually operable cell for processing fluid comprising a multiple switch sequence timer means electrically interconnected to actuate a multiple switch interval timer means, a plurality of electrically operated valves arranged to be sequentially actuated by the switches of said sequence timer means to control the admission of various fluids to said irradiation cell, said interval timer means including a maintaining circuit having a predetermined maintaining interval for actuating several of the electrically operated valves for the maintaining interval.

14. The circuit of claim 13 wherein the interval timer means also includes a change-over relay circuit, said sequence timer means is electrically actuated by said change-over relay circuit to operate said valves to admit a flushing fluid to said cell.

15. The circuit as defined in claim 14 including at least one valve controlling the admission of a cleaning fluid to said cell, a second valve controlling the admission of a flushing fluid to said cell and a third valve controlling the admission of the "process" liquid to said cell, and said circuit includes a call annunciator operated by a switch of said sequence timer means, said switch being closed at the moment the interval timer means ceases operation.

References Cited in the file of this patent

UNITED STATES PATENTS

| | | |
|---|---|---|
| 1,190,769 | Jurist | July 11, 1915 |
| 1,918,753 | Jacobsen | July 18, 1933 |
| 1,945,102 | Tranin et al. | Jan. 30, 1934 |
| 2,085,086 | Drake | June 29, 1937 |
| 2,298,124 | Hartman | Oct. 6, 1942 |
| 2,561,631 | Negri | July 24, 1951 |
| 2,570,148 | Neuroth et al. | Oct. 2, 1951 |
| 2,589,689 | Governale et al. | Mar. 18, 1952 |
| 2,595,793 | Kay | May 6, 1952 |